F. P. MILLS.
Electric Speaking-Telephone.
No. 220,855. Patented Oct. 21, 1879.
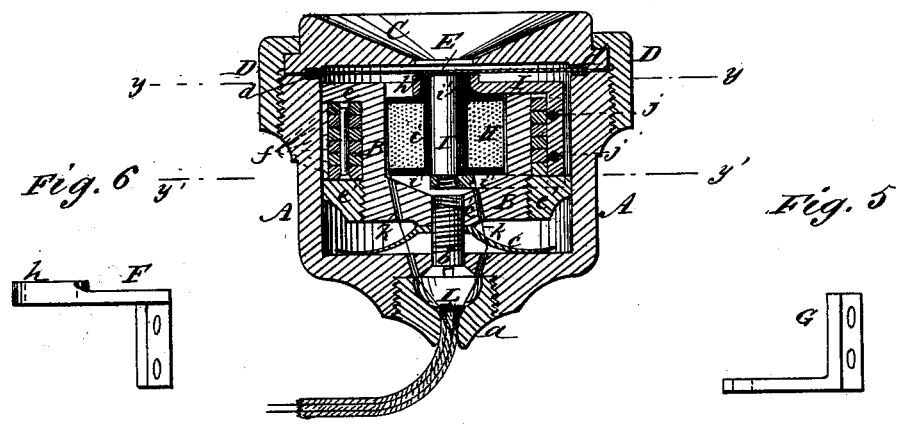
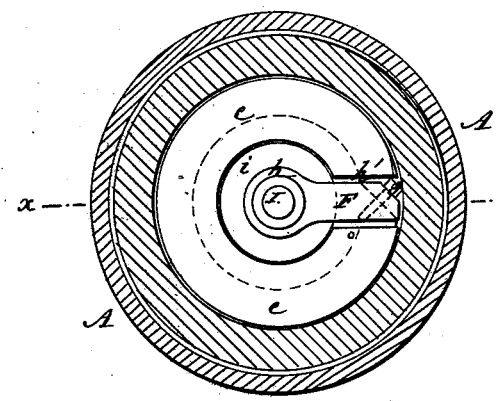
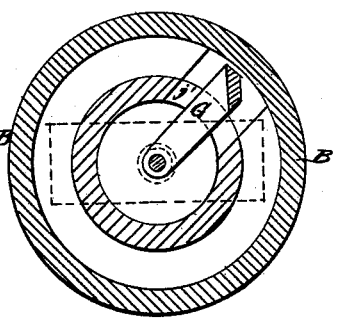
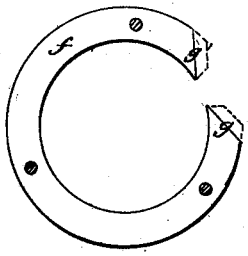
WITNESSES:
C. Neveux
C. Sedgwick
INVENTOR:
F. P. Mills
BY Munn & Co
ATTORNEYS.

UNITED STATES PATENT OFFICE.

FRANK P. MILLS, OF ISHPEMING, MICHIGAN.

IMPROVEMENT IN ELECTRIC SPEAKING-TELEPHONES.

Specification forming part of Letters Patent No. 220,855, dated October 21, 1879; application filed March 5, 1879.

*To all whom it may concern:*

Be it known that I, FRANK P. MILLS, of Ishpeming, in the county of Marquette and State of Michigan, have invented a new and Improved Speaking-Telephone, of which the following is a specification.

The object of this invention is to increase the sensitiveness of speaking-telephones and the resulting effects by a new arrangement of the permanent magnet and the armatures thereof; and it consists, essentially, of a circular or cylindrical magnet surrounding the helix, the poles whereof are brought close together, but insulated from each other by a peculiar arrangement and construction of armatures; also, in novel arrangements of the frame and casing and the spool around which the helix is coiled, fully described in the specification and shown in the drawings forming part thereof.

In the accompanying drawings, Figure 1 is a sectional view of the telephone, taken on line $x\ x$ of Fig. 2. Fig. 2 is a horizontal section on line $y\ y$, Fig. 1. Fig. 3 is a section on line $y'\ y'$, Fig. 1. Fig. 4 is a plan of the permanent magnet, and Figs. 5 and 6 represent the two armatures.

Similar letters of reference indicate corresponding parts.

Referring to the drawings, A represents the circular box or casing of the instrument, having a threaded socket in the bottom for the reception of a screw-plug, $a$. From the bottom of this socket the adjustment-screw $b$ is passed through to the interior of the case, and thence through the adjustment-spring $c$, the ends whereof bear against the inside bottom of the case. The end of the screw engages a threaded hole, $c'$, in the center of the bottom of the circular frame B, containing the magnets and helix of the instrument. By means of this screw moving the frame back and forth in the case the distance of the poles of the magnet from the diaphragm may be properly adjusted, while the plug $a$ conceals the set-screw, and thus prevents interference therewith and unauthorized changes of adjustment.

C represents the mouth-piece, placed on the edge of the case A, and secured by a screw-cap, D, passed over the mouth-piece, so that a part will bear on a flange on the periphery thereof, and engaging a screw-thread on the periphery of the case A.

E is the diaphragm, the edges whereof are held between the under side of the mouth-piece and the adjacent end of the case; but between the adjacent parts of the case and mouth-piece and the confined edges of the diaphragm is placed a ring or rings of blotting-paper or other suitable material, $d$, to serve as a damper for the diaphragm.

The frame B has a crown-flange, $e$, and at the opposite end a screw-follower, $e'$. Between the flange and follower is held the annular laminated permanent steel magnet $f$, the poles $g\ g'$ whereof are in the same line on one side of the frame, so as to leave a channel or space on one side of the magnet. The pole ends of the magnet are beveled or chamfered off at such an angle that lines drawn parallel to the tangents of the circle at points ninety degrees each way from the middle of the beveled ends, and cutting the corners of the magnet, will be the width required for the armatures or induced magnets F and G. These armatures are right-angular pieces of soft iron, the face of one arm of each being turned obliquely to the other, and the obliquely-placed arm provided with screw holes. The upper arm of F has at its end a ring, $h$, while the corresponding end of armature G has a screw-threaded hole.

H is the helix of insulated wire wrapped around the insulating-spool $i$, the upper end of the cylindrical part whereof is extended above the upper flange of the spool. I is the soft-iron core placed in the cylindrical part of the spool, the upper end flush with the elongated end of the cylinder of the spool, while the lower end terminates with a threaded stud beyond the lower end of the spool, as clearly shown in Fig. 1.

The armature F is connected with the magnets in the following way: The ring $h$ is placed around the upper elongated end of the spool, the upper arm lies in a channel or groove, $h'$, made radially in the crown-flange $e$, and the obliquely-placed arm lies in contact with one of the poles—say $g$—of the laminated magnet, to which it is secured by screws $j$.

The armature G is connected by one arm, (passed through an opening, $j$,) through the threaded hole therein, with the screw-stud on the lower end of the soft-iron core I, while its obliquely-placed arm is laid in contact with and secured by screws to the pole g' of the laminated magnet. Through these connections the ring h of armature F and the adjacent upper end of soft-iron core I become the induced poles of the permanent steel magnet f, insulated from each other by the elongated end of the spool-cylinder, but are inductively connected through the diaphragm when, by its vibrations, it approaches and recedes from the two poles.

The terminal wires k k' of the helix pass through holes in the bottom of the frame, thence through holes in the bottom of the case, to the plug a, where they connect with the conducting-wires L.

The frame B and follower e' may be made of wood or rubber, as may also the case-cap and mouth-piece.

The diaphragm is preferably made of thin metal; but any other material capable of being thrown into vibration by sound may be substituted for the iron, provided a piece of inductive metal be attached to it opposite the poles of the magnet, so that, when vibrated, it will form an inductive connection between these poles over the insulator.

I have described the permanent steel magnet as laminated; but, if preferred, it may be made of a solid cylinder, with a longitudinal slit on one side, forming the two poles with chamfered or beveled edges, to connect with the oblique faces of the armatures F and G, as before mentioned.

The operation of this telephone it is not necessary to describe, as it is essentially the same as others; but the peculiar construction and arrangement of the magnets are found to give the instrument greater sensitiveness to the vibrations of the diaphragm than any now in use, with the result of increasing its sound-conveying power and the effects produced at the receiver.

While reference has been made to the instrument as a transmitter, it is equally useful as a receiving-instrument.

I am aware that the dampening-rings hereinbefore described are not new or of my invention; but

What I claim is—

1. The circular or cylindrical permanent steel magnet, solid or laminated, and having its poles beveled or chamfered for connection with the armatures F and G, substantially as described.

2. In combination with the cylindrical magnet, the armatures F and G, right-angular, and with oblique faces for connecting with the poles of the magnet and the soft-iron core connecting with the armature G, for the purpose of bringing the two poles in close proximity to each other and to the diaphragm, by the vibrations of which the inductive connection between the poles is made and broken, substantially as described.

3. The frame B, with crown-flange e, having channel h' for the armature F, and opening j' for the passage of armature G, in combination with the permanent magnet and its connecting armatures, held in position by the follower e', the case A, and adjustment-screw b, whereby the magnetic poles can be quickly and easily adjusted with relation to the diaphragm, substantially as described.

4. The spool i, with elongated cylindrical portion i', to insulate the two poles of the magnet, substantially as described.

FRANK PURDY MILLS.

Witnesses:
JOHN GLEASON,
TIMOTHY HARRINGTON.